United States Patent

[11] 3,613,781

[72] Inventor Robert O. Barratt
 Parsippany, N.J.
[21] Appl. No. 843,527
[22] Filed July 22, 1969
[45] Patented Oct. 19, 1971
[73] Assignee Foster Wheeler Corporation
 Livingston, N.J.

[54] BAYONET TUBE BANK VAPOR GENERATOR
 10 Claims, 4 Drawing Figs.
[52] U.S. Cl. ................................................... 165/145,
  122/32, 122/34
[51] Int. Cl. ................................................. F28f 9/22
[50] Field of Search ........................................... 122/32, 34;
  165/142, 5, 163

[56] References Cited
 UNITED STATES PATENTS

| | | | |
|---|---|---|---|
| 1,761,035 | 6/1930 | Govers | 165/142 |
| 2,706,106 | 4/1955 | Roswell | 165/142 |
| 3,054,599 | 9/1962 | Fabregas | 122/32 X |
| 3,245,464 | 4/1966 | Ammon et al. | 165/145 |

Primary Examiner—Martin P. Schwadron
Assistant Examiner—Theophil W. Streule
Attorneys—John E. Wilson, John Maier, III and Marvin A. Naigur ABSTRACT: This invention relates to a sodium heated vapor generator utilizing a parallel, multiple bayonet tube configuration, with each tube configuration having an annular helical swirl chamber retained within an outer pressure baffle tube and encircling an inner water inlet tube. A fluid is circulated through the inlet tubes which in turn extend into the pressure tubes which are immersed in a body of hot sodium liquid.

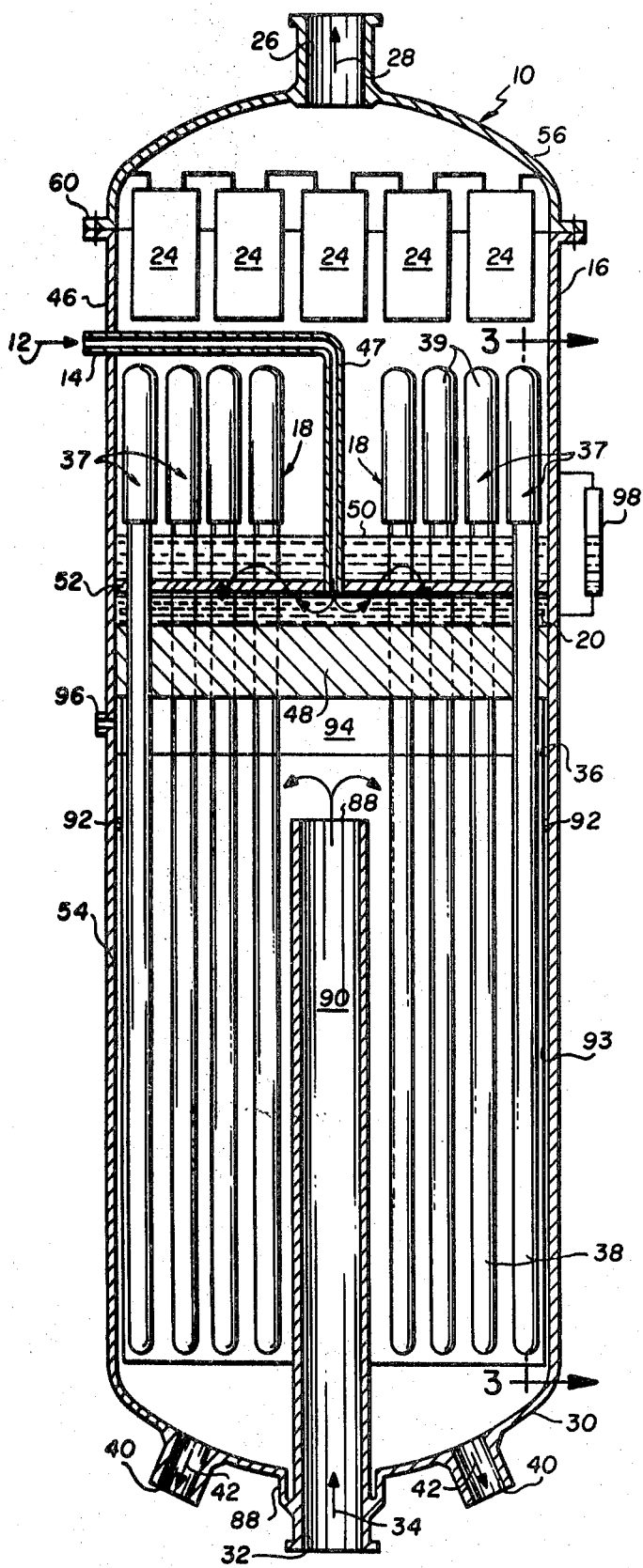
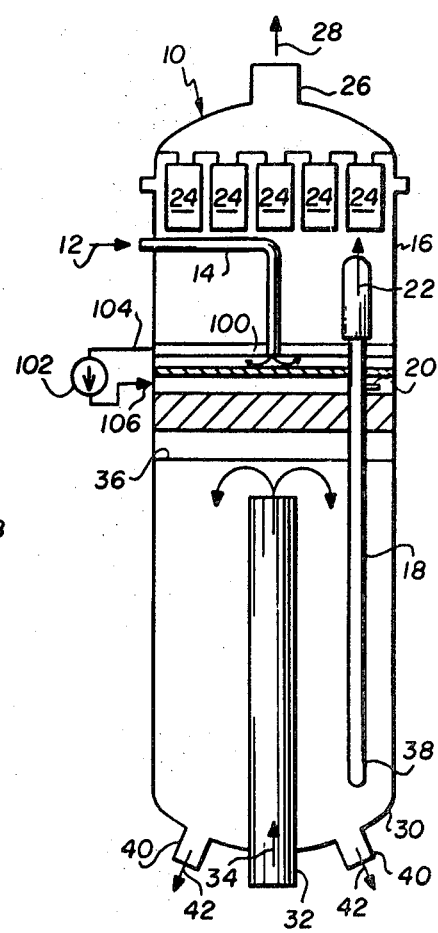
FIG.1
FIG.2
INVENTOR.
ROBERT O. BARRATT

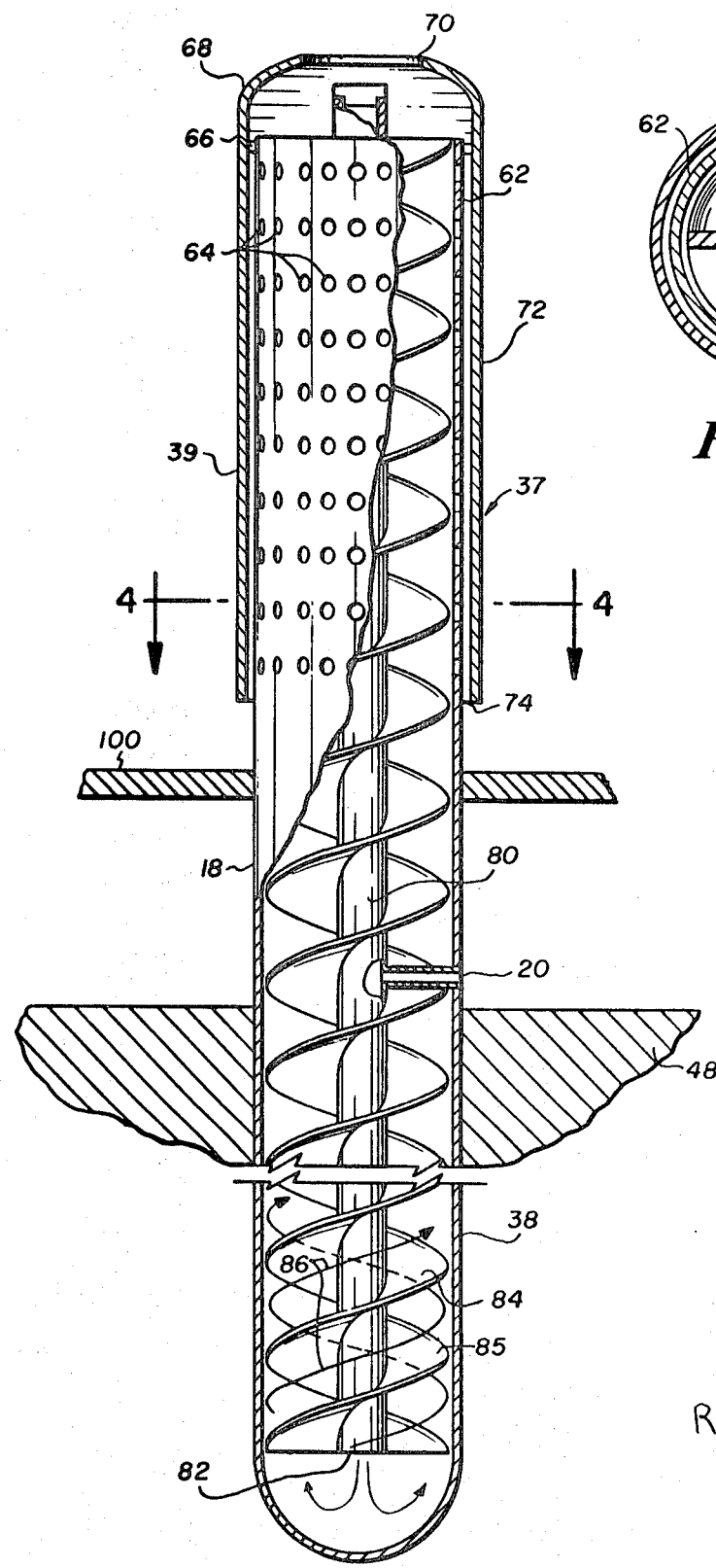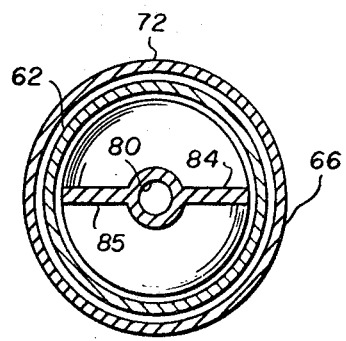

BAYONET TUBE BANK VAPOR GENERATOR

BACKGROUND OF THE INVENTION

Heretofore, different types of sodium heated vapor generator tube arrangements have been considered, including those having various heat transfer surface configurations. In addition, different sodium heated vapor generator systems have been used, such as once-through and natural circulation systems. These arrangements use liquid sodium coolant of a nuclear reactor, as a heat carrier, for evaporating a fluid such as water in a vapor generator. In recent years considerable effort has been directed towards the development of a closed-circuit thermal power plant for the long term generation of electrical power through nuclear heat. In a typical power plant of this type, economics dictate use of the smallest number of tubes. In natural circulation and forced recirculation units, it is essential to increase the percent of steam by weight leaving the evaporating bank of tubes of the generator to a maximum.

The bayonet tube bank assembly of the present invention represents a flexible design which lends itself to both natural circulation and forced recirculation arrangements. The flexibility of the bayonet tube bank design is utilized to obtain low load stability and integral separation and drum configuration. Also, the bayonet tube serves to increase the maximum permissible heat flux that the evaporator experiences from the initial heat reaction of the hot sodium. This arrangement will increase the two-phase fluid exit quality without encountering departure from nucleate boiling while still maintaining a down-flow sodium circuit and thereby avoiding the sodium stagnation problems associated with up-flow sodium systems. In this connection, it should be noted that it is advantageous to maintain nucleate boiling in the vapor generator tubes, since this results in a relatively high heat transfer coefficient and a corresponding relatively low tube wall temperature. Whereas, if there is constant fluctuation from nucleate boiling to film boiling in the vapor generator tubes, substantial temperature increases and decreases will occur, and the attendant thermal stresses will result in tube failure.

SUMMARY OF THE INVENTION

In accordance with an illustrative embodiment demonstrating advantages and features of the present invention there is provided a vapor generator adapted to place a single phase primary fluid, such as sodium, in indirect heat exchange with a vaporizable secondary fluid, such as feedwater, to effect partial vaporization. The vapor generator comprises an elongated vessel having an inlet opening and an outlet opening, means in flow communication with the vessel through the inlet opening for maintaining a reservoir of liquid sodium, and means for circulating the feedwater through the vessel in indirect heat exchange relation with the liquid sodium. A bank of elongated tubes is mounted in axial alignment within the vessel for bringing the feedwater into indirect heat exchange with the liquid sodium to form a two-phase mixture of steam and water. Each of the elongated tubes includes an outer tube section formed by a first continuous wall having a series of perforations, and a separator tube section formed by a second continuous wall coaxially aligned with and spaced apart from the outer surface of the first continuous wall along the perforations. The outer tube, separator tube and outlet opening are all in flow communication. Means are provided in each of the inlet tube sections which form a substantially helical flow path such that the two-phase mixture of steam and water swirls upwardly through the inlet tube section, whereby the steam passes through the upper opening to the outlet opening and the water is passed through the perforations to the separator tube.

BRIEF DESCRIPTION OF THE DRAWINGS

The above brief description, as well as further objects, features and advantages of the present invention will be more fully appreciated by reference to the following detailed description of presently preferred but nonetheless illustrative embodiments in accordance with the present invention, when taken in connection with the accompanying drawings, wherein:

FIG. 1 is a diagrammatic sectional view of a sodium heated forced recirculation vapor generator employing the bayonet tube assembly of the present invention;

FIG. 2 is an enlarged sectional view of a natural circulation vapor generator employing the bayonet tube bank assembly of the present invention.

FIG. 3 is an enlarged sectional view of a bayonet tube taken along line 3—3 of FIG. 2; and FIG. 4 is a transverse sectional view taken along line 4—4 of FIG. 3.

DESCRIPTION OF THE PREFERRED EMBODIMENT

While the present invention will be described in connection with a heat exchange system such as a vapor generator employing liquid sodium and water as the heat exchange mediums, it will be apparent that this invention will be useful in other applications and in other heat exchangers in which heat is exchanged between mediums other than sodium and water. Accordingly, the instant invention is adapted to placing a single phase primary fluid in heat exchange with a vaporizable secondary fluid to effect partial vaporization.

Referring to the drawing and more particularly to FIG. 1, working fluid such as water is delivered at a predetermined pressure by a boiler feed pump means which is not shown to a vapor generator, generally designated by the number 10. The working fluid flows in a direction as shown by the arrow 12 to a water inlet pipe 14 mounted inside an elongated pressure vessel 16. A bayonet tube bank assembly 18 is provided with an inlet connection 20 for receiving the working fluid which emerges from tube bank assembly 18 as a two-phase fluid mixture of steam and water. As hereinafter more fully explained, and as shown by directional arrow 22, the working fluid passes through dryers 24, which for example may be of the Chevron type, to an outlet nozzle 26, as indicated by the arrow 28. The steam of the two-phase fluid mixture can then be directed to a superheater which has not been shown and thereafter to a turbine-generator system to produce electricity.

Hot liquid sodium is introduced into the pressure vessel 16 at its lower hemispherical end 30 through a sodium inlet pipe 32 in an upward direction as shown by the arrow 34, to a reservoir level which is designated by the numeral 36. It should be noted that the sodium inlet pipe 32 could also be disposed horizontally in the sidewall of pressure vessel 16 rather than in the vertical position shown in FIG. 2.

The bayonet tube bank assembly 18 comprises a plurality of bayonet tubes 37 including an outer tube 38, the upper portion of which is coaxially positioned in a separator tube 39, and the lower portion of which is emersed to the liquid sodium reservoir level 36. It should be understood that FIGS. 1 and 2 are only schematic representations of the actual number of bayonet tubes 37. Accordingly, in actual practice the vapor generator 10 would incorporate a relatively large number of bayonet tubes 37 which would most likely cover the complete inner cross-sectional area of the pressure vessel 16.

Turning to the detailed drawings of the vapor generator 10, as shown in FIGS. 2, 3 and 4 natural circulation is utilized and the working fluid, to be henceforth referred to as feedwater, is forced by a pump means in the direction of the arrow 12 through the inlet pipe 14 which is attached to cylindrical wall 46 of pressure vessel 16. The feedwater flows in a generally horizontal path through an elbow 47 of the inlet pipe 14 in a generally central location with respect to the horizontal plane of the vapor generator 10 and then in a downward direction, to a predetermined distance above the tube sheet 48 and below the water level designated by the numeral 50. The inlet pipe 14 extending vertically from the elbow 47 is mounted on a spacer arrangement in the form of radial arms 52 which are provided in the natural circulation version of the vapor generator 10 that is shown in FIG. 2. In this manner, the water from the level 50 to the tube sheet 48 is in flow communication with the connection 20 to complete the natural circulation circuit.

The pressure vessel 16 is integrally formed with the lower hemispherical end 30, an upright cylindrical wall 54 and an upper hemispherical end 56. The hemispherical end 56 is removably secured at flange 60 for complete withdrawal of the dryers 24 and for removal of the bayonet tube bank assemblies 18.

As best shown in FIG. 3, the lower portion of outer tube 38 is secured to and depends from the tube sheet 48. It should be noted that the lower portion of outer tube 38 functions as the evaporator section of the bayonet tube bank assembly 18. The outer tube 38 continues vertically upwards, through the tube sheet 48 to form a baffle tube end 62. Radially about the periphery of the baffle tube end 62 there is formed a plurality of perforations 64. The baffle tube end 62 is coaxially positioned in the separator tube 39 and is secured thereto by means of support pins 66. The separator tube 39 includes a hemispherical end 68 which is formed with a centrally located upper opening 70 and a cylindrical wall 72 formed with a lower opening 74, such that the perforations 64 are completely enshrouded.

Positioned above tube sheet 48 on the lower portion of outer tube 38 is the inlet connection 20 which is in flow communication with an inner water inlet tube 80, that depends vertically downward from baffle tube end 62 to a bottom tip 82. Mounted along the outer circumference of the water inlet tube 80 is a pair of continuous helical swirl vanes 84 and 85 which extend the full length of inlet tube 80 to form a substantially helical flow path designated by the directional arrow 86. While the swirl vanes 84 and 85 of FIG. 3 are shown spaced apart to form the helical path 86, this could also be obtained by a single vane having a suitable helical configuration to form the path 86. It should be noted that the water inlet tube 80 functions as a partial preheater or economizer section for the vapor generator 10, while the lower portion of outer tube 38, extending downwardly from the separator tube 39, functions as a primary evaporator.

As best shown by the arrow 34 of FIG. 2, the hot reactor sodium enters the vapor generator 10 through the sodium inlet pipe 32 which is integrally formed with a thermal sleeve 88 and riser tube 90. The sodium is directed over the top end of riser tube 90 and then flows downwardly to outlet nozzles 40 in the direction of arrows 42. The liquid sodium reservoir level 36 is maintained substantially constant by the recirculation of hot liquid sodium for the reactor.

As shown in FIG. 2, contained within the pressure vessel 16 and mounted on expansion joints 92 is a flow baffle 93, which forms a vertically extending open ended cylindrical sodium flow enclosure to promote efficient heat transfer over the surface. The flow baffle 93 is supported against the effects of the hydrostatic pressure by the equalizing effects of the stagnant sodium accumulated on the external portion of flow baffle 93 which bears against the outside of the enclosure. As the sodium flows down and around the bayonet tube assembly 18, it cools and this temperature profile is reflected in the stagnant sodium outside the flow baffle 93, thus minimizing the effects of thermal stress. The expansion joints 92 accommodate any differential growth effects from the heat transfer to the flow baffle 93.

The space between the sodium reservoir level 36 and tube sheet 48 defines a surge chamber 94 which is filled with an inert cover gas. The pressure vessel 16 is provided with an inlet 96 through which the inert gas such as argon may be supplied to the surge chamber 94 and maintained therein at a predetermined pressure. A discharge pipe may be provided from the surge chamber 94 and may be closed by a pressure relief diaphragm made of a suitable frangible material which could rupture in the event that the pressure within the surge chamber 94 increases substantially above the normal pressure level maintained therein.

In the operation of the vapor generator 10, the pressure vessel 16 is initially filled with hot liquid sodium through sodium inlet pipe 32 until the rising sodium within the tank reaches the reservoir level 36. The reacted hot sodium is circulated to and from vapor generator 10 through the sodium inlet pipe 32 and the outlet nozzles 40, respectively. The liquid sodium is distributed upwardly through the riser tube 90 and directed substantially uniformly about the bayonet tube bank assembly 18 and then downwardly from tube sheet 48 in a countercurrent direction to the fluid flow within the bayonet tube bank assembly 18, with the liquid sodium returning to the reactor through the outlet nozzles 40.

The feedwater is delivered to the bayonet tube bank assembly 18 through the water inlet pipe 14 until the water level 50 is attained, as indicated on a level gauge 98 which is shown in FIG. 2. The feedwater passes from inlet pipe 14 into inlet connection 20 and downwardly into the water inlet pipe 80. The feedwater flows downwardly from inlet connection 20 to the bottom tip 82 of the inlet pipe 80 and indirect heat exchange occurs below tube sheet 48 between the liquid sodium in contact with the outer surface of outer tube 38 and the feedwater in contact with the inner surface of outer tube 38, such that a two-phase mixture of steam and water is formed in the outer tube 38. The upward flowing steam-water mixture is swirled along helical flow path 86. It should be noted that the two-phase fluid, which swirls upwardly toward tube sheet 48, serves as a means of preheating the feedwater which is introduced downwardly through inlet pipe 80. The two-phase steam and water mixture continues upwardly into the baffle tube end 62, with the water portion of the two-phase mixture being thrown outwardly through the perforations 64, essentially by centrifugal force, and the separated steam passes through opening 70 into contact with the dryers 24. The water which is expelled through the perforations 64 forms droplets along the interior of cylindrical wall 72 which subsequently flow downwardly to combine with the feedwater to be recirculated as herein described.

Through the evaporation process which has been outlined above, the steam from the dryers 24 exits in the direction of arrow 28 through outlet nozzle 26 to the steam user.

The vapor generator 10 of FIG. 2 operates as a natural circulation unit in the manner hereinbefore described, but for economic reasons, it may prove desirable to increase the water side pressure drop. As shown in FIG. 1, this would necessitate providing a supplementary tube sheet 100, a recirculating pump 102 with an associated pipe system 104, such that a forced circulation system would be obtained.

Operation of the forced recirculation vapor generator 10 of FIG. 1, would be in the same manner as previously described for the natural circulation vapor generator of FIG. 2, except that water separated from the two-phase fluid in the separator tubes 39 would have to be pumped into the lower area below the tube sheet 100, as shown by arrow 106, where it would enter the bayonet tube bank assembly 18 via the inlet connection 20.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A vapor generator capable of achieving indirect heat exchange between a single phase primary fluid and a vaporizable secondary fluid to effect partial vaporization of said secondary fluid comprising
an elongated vessel having an inlet opening and an outlet opening,
means in flow communication with said vessel through said inlet opening for maintaining a reservoir of said primary fluid,
means for circulating said secondary fluid through said vessel in indirect heat exchange relation with said primary fluid, a bank of elongated tubes mounted in axial alignment within said vessel for partially vaporizing said secondary fluid into a two-phase mixture of liquid and vapor, each of said elongated tubes including an outer tube section formed by a first continuous wall having a series of perforations, and a separator tube section formed by a second continuous wall coaxially aligned with and spaced apart from the outer surface of the first continuous wall along said perforations, with said outer tube, separator tube and outlet opening being in flow communication, means in each of said outer tube sections which form a substantially spiral flow path such that said two-phase mixture of liquid and vapor swirls upwardly through said outer tube whereby the vapor passes through said upper opening to said outlet opening and the liquid is passed through said perforations to said separator tube section.

2. A vapor generator adapted for placing liquid sodium in indirect heat exchange with feedwater comprising an elongated vessel having an inlet opening and an outlet opening, means in flow communication with said vessel through said inlet opening for maintaining a reservoir of liquid sodium, means for circulating said feedwater through said vessel in indirect heat exchange relation with said liquid sodium, a bank elongated tubes mounted in axial alignment within said vessel for partially vaporizing said feedwater into a two-phase mixture of steam and water, each of said elongated tubes including an inlet tube section formed by a first continuous wall having a series of perforations, and a separator tube section, formed by a second continuous wall coaxially aligned with and spaced apart from the outer surface of the first continuous wall along said perforations, with said outer tube, separator tube and outlet opening being in flow communication, means in each of said inlet tube sections which form a substantially spiral flow path such that said two-phase mixture of water and steam swirls upwardly through said outer tube section, whereby the steam passes through said upper opening to said outlet opening and the water is passed through said perforations to said separator tube section.

3. A vapor generator according to claim 2 in which said outer tube is coaxially positioned within said separator tube and a portion of said first continuous wall longitudinally extends within said second continuous wall to form an annular chamber between said first continuous wall and said second continuous wall.

4. A vapor generator according to claim 2 in which said means that form said spiral flow path include a vertical stem coaxially and centrally mounted within said separator tube and a pair of continuous swirl vanes generated by substantially the same helix and secured to said vertical stem in a spaced apart position to form two helical flow paths.

5. A vapor generator according to claim 2 in which the means for circulating feedwater is in flow communication with said outer tube section such that said feedwater flows countercurrent to the flow of said two-phase mixture of steam and water.

6. A vapor generator according to claim 2 in which said first and second continuous walls have a cylindrical configuration with said second continuous wall having an inner diameter which is greater than the outer diameter of said first continuous wall such that an annular chamber is formed between said outer tube and said separator tube whereby the flow of said two-phase mixture of steam and water along said helical flow path produces centrifugal force which throws said water radially outwardly through said perforations into said annular chamber.

7. A natural circulation vapor generator adapted for placing liquid sodium in indirect heat exchange with feedwater comprising an elongated vessel having an inlet opening and an outlet opening, means in flow communication with said vessel through said inlet opening for maintaining a reservoir of liquid sodium, means for passing said feedwater through said vessel in indirect heat exchange relation with said liquid sodium, a bank of elongated tubes mounted in axial alignment within said vessel for partially vaporizing said feedwater into a two-phase mixture of steam and water, each of said elongated tubes including a cylindrical outer tube section formed by a first continuous wall having a series of perforations, and a cylindrical separator tube section, formed by a second continuous wall coaxially aligned with and spaced apart from the outer surface of the first continuous wall along said perforations, with said inlet tube, separator tube and outlet opening being in flow communication, means in each of said outer tube sections which form a substantially helical flow path such that said two-phase mixture of water and steam swirls upwardly through said outer tube section, the steam passes through said upper opening to said outlet opening, and the water is passed through said perforations to said separator tube section, and means in said vessel for receiving the water from said separator tube section and maintaining a natural circulation flow path to said inlet tube section.

8. A vapor generator according to claim 7 in which a tube sheet formed with openings for mounting the outer tube sections is mounted in said vessel, such that said tube sheet separates said natural circulation flow path from said liquid sodium.

9. A forced recirculation vapor generator adapted for placing liquid sodium in indirect heat exchange with feedwater comprising an elongated vessel having an inlet opening and an outlet opening, means in flow communication with said vessel through said inlet opening for maintaining a reservoir of liquid sodium, means for passing said feedwater through said vessel in indirect heat exchange relation with said liquid sodium, a bank of elongated tubes mounted in axial alignment within said vessel for partially vaporizing vaporizing said feedwater into a two-phase mixture of steam and water, each of said elongated tubes including a cylindrical outer tube section formed by a first continuous wall having a series of perforations, and a cylindrical separator tube section, formed by a second continuous wall coaxially aligned with and spaced apart from the outer surface of the first continuous wall along said perforations, with said outer tube, separator tube and outlet opening being in flow communication, means in each of said outer tube sections which form a substantially helical flow path such that said two-phase mixture of water and steam swirls upwardly through said outer tube section, the steam passes through said upper opening to said outlet opening, and the water is passed through said perforations to said separator tube section, means in said vessel for receiving the water from the separator tube sections, and pump means for recirculating the water from said separator tube sections through a natural circulation flow path to the outer tube sections.

10. A vapor generator according to claim 9 in which a first tube sheet formed with openings for mounting the outer tube sections is mounted in said vessel such that a feedwater level is established above said first tube sheet, and a second tube sheet formed with openings for mounting said outer tube sections is mounted in said vessel below said first tube sheet to form a cylindrical chamber, in flow communication with the helical flow paths, for receiving the water from said separator tube sections.